(12) United States Patent
Yamanashi

(10) Patent No.: US 6,222,345 B1
(45) Date of Patent: Apr. 24, 2001

(54) CONTROL DEVICE FOR A BATTERY

(75) Inventor: Hidenori Yamanashi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/610,368

(22) Filed: Jul. 5, 2000

(30) Foreign Application Priority Data

Jul. 5, 1999 (JP) .............................................. 11-1902637

(51) Int. Cl.$^7$ .................................................. H01M 10/46
(52) U.S. Cl. ........................................... 320/132; 320/162
(58) Field of Search ..................................... 320/127, 128, 320/132, 149, 162, 104, DIG. 21; 324/426, 427, 433

(56) References Cited

U.S. PATENT DOCUMENTS 5,936,383 * 8/1999 Ng et al. .

* cited by examiner

Primary Examiner—Edward H. Tso
(74) Attorney, Agent, or Firm—Finnegan, Henderson, Farabow, Garrett & Dunner, L.L.P.

(57) ABSTRACT

A device capable to accurately controll a battery 1, which is charged by an electric power supplied through a power supplying line 15 for charging, is provided. The control device for a battery 1 includes: voltage measuring means Vm for measuring a terminal voltage of the battery 1; current measuring means Im for measuring a charging current flowing through the power supplying line 15 for charging; charging characteristic computing means 21A for computing an approximate correlated linear characteristic between the terminal voltage and the charging current on the basis of periodic changes in the terminal voltage measured by the voltage measuring means Vm and in the charging current measured by the current measuring means Im during a charging operation of the battery 1; and full charging capacity computing means 21B for computing a full charging capacity of the battery 1 on the basis of the approximate correlated linear characteristic computed by the charging characteristic computing means 21A and a predetermined reference value of the charging current.

3 Claims, 4 Drawing Sheets

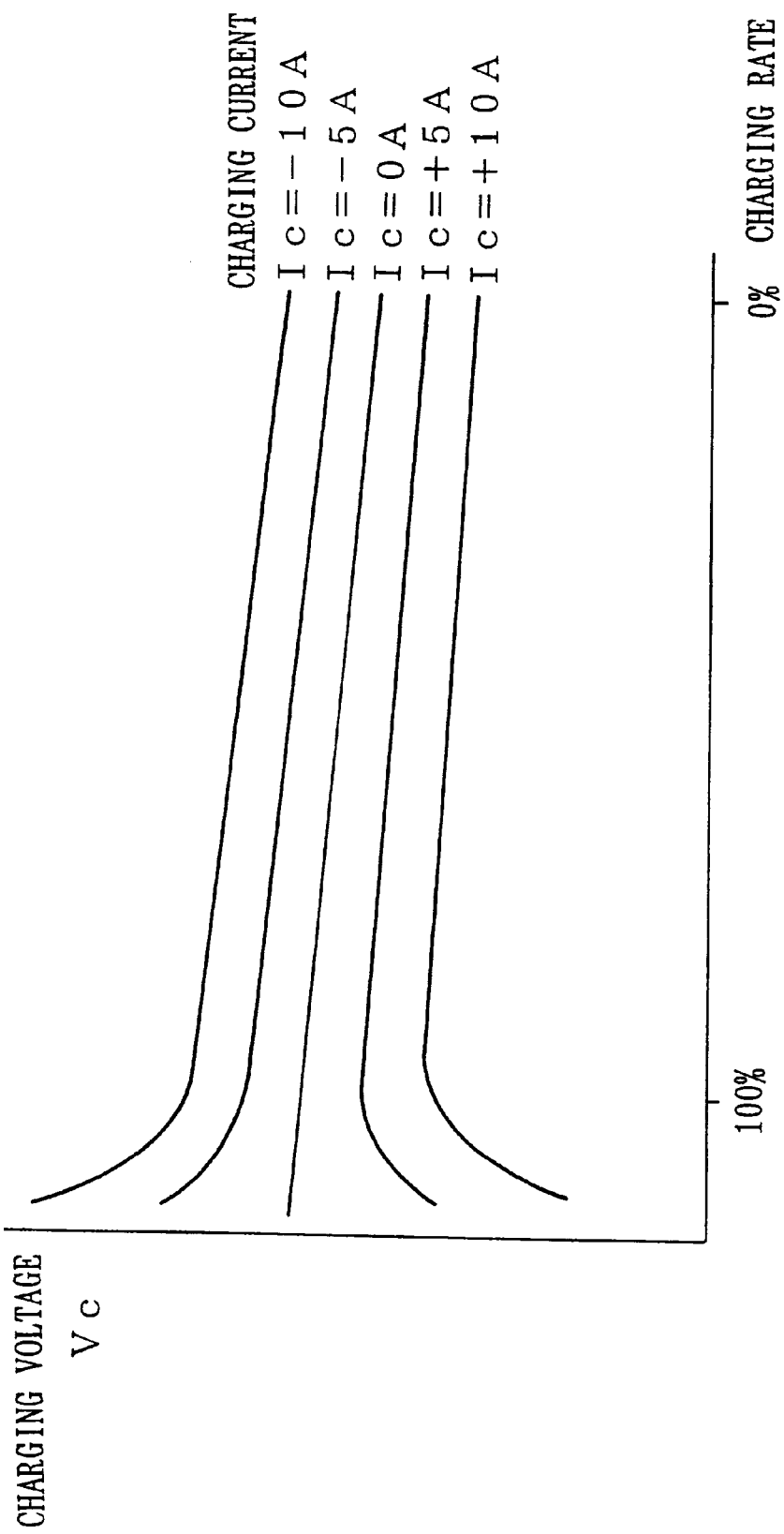
F I G. 4

CONTROL DEVICE FOR A BATTERY

BACKGROUND OF THE INVENTION (1) Field of the Invention

This invention relates to a control device for a battery, which is charged by an electric power supplied through a power supplying line for charging the battery.

(2) Description of the Related Art

A battery loaded on a hybrid or electric vehicle for supplying power to a motor for traveling is charged as the need arises by reverse electromotive force arising in the motor upon speed reducing of the vehicle or an electric power from an alternator driven by an engine.

It is well known that a full charging capacity of a battery changes depending on change in surrounding temperature. If the change in the full charging capacity is not followed correctly, a charge of battery is controlled on the basis of a constant full charging capacity in spite of temperature change, resulting in an overcharging of the battery and deterioration in a charging performance of the battery.

A measure to solve the above problem may be as follows: a charging current flowing in a power supplying line for charging the battery and a terminal voltage of the battery are measured; a correlation between the charging current and the terminal voltage is computed; and a full charging capacity of the battery is evaluated on the basis of the correlation.

A change in an internal impedance of the battery when the battery approachs its fully charged state varies depending upon surrounding temperature. Therefore, when the battery is controlled on the basis of the full charging capacity simply derived from the correlation between the charging current and the terminal voltage without taking a factor of temperature into consideration, the battery might not be controlled properly since the full charging capacity derived in such a manner is not accurate.

The problem in controlling a battery described above widely arises for general batteries subjected to repeated charge and discharge besides the battery loaded on a hybrid or electric vehicle.

SUMMARY OF THE INVENTION

It is therefore an objective of the present invention to solve the above problem and to provide a device capable to accurately controll a battery, which is charged by an electric power supplied through a power supplying line for charging.

In order to attain the above objective, as shown in FIG. 1 illustrating a basic construction of a control device for a battery according to the present invention, the present invention is to provide a device for controlling a battery 1 charged by an electric power supplied through a power supplying line 15 for charging, comprising: voltage measuring means Vm for measuring a terminal voltage of the battery 1; current measuring means Im for measuring a charging current flowing through the power supplying line 15 for charging; charging characteristic computing means 21A for computing an approximate correlated linear characteristic between the terminal voltage and the charging current on the basis of periodic changes in the terminal voltage measured by the voltage measuring means Vm and in the charging current measured by the current measuring means Im during a charging operation of the battery 1; and full charging capacity computing means 21B for computing a full charging capacity of the battery 1 on the basis of the approximate correlated linear characteristic computed by the charging characteristic computing means 21A and a predetermined reference value of the charging current.

With the construction of the control device for a battery described above, the full charging capacity computing means 21B computes the full charging capacity of the battery 1 on the basis of an approximate correlated linear characteristic computed by the charging characteristic computing means 21A between the terminal voltage and the charging current of the battery 1, together with not an actual charging current measured by the current measuring means Im flowing through the power supplying line 15 for charging, but a predetermined reference value of the charging current. Therefore, even if the charging current in a state in the vicinity of the fully charged state of the battery significantly changes in response to surrounding temperature caused by a fluctuation of change in an internal impedance of the battery due to the surrounding temperature, the full charging capacity of the battery 1 can be accurately computed on the basis of the approximate correlated linear characteristic between the terminal voltage and the charging current of the battery 1.

The predetermined reference value of the charging current is a value showing a linear changing characteristic with respect to a change in the charging capacity of the battery 1.

With the construction described above, the full charging capacity computing means 21B accurately computes a full charging capacity of the battery 1 at any time from the beginning to the end of a charging operation.

The control device for a battery 1 further comprises charging end control means 21C for controlling an end of charging operation of the battery 1 in response to the full charging capacity thereof, wherein the charging characteristic computing means 21A computes the approximate linear characteristic whenever the charging operation of the battery 1 arises, the full charging capacity computing means 21B computes the full charging capacity of the battery 1 whenever the charging operation of the battery 1 arises, and the charging end control means 21C changes a timing of an end of charging operation of the battery 1 in response to the full charging capacity thereof most currently computed whenever the full charging capacity computing means 21B computes the full charging capacity of the battery 1.

With the construction described above, since the charging end control means 21C changes a timing of an end of charging operation of the battery 1 in response to the most current value of the full charging capacity among values thereof computed by the full charging capacity computing means 21B whenever the charging operation of the battery 1 arises, the end of charging operation of the battery 1 is controlled by the charging end control means 21C in response to the full charging capacity computed by the full charging capacity computing means 21B during the charging operation.

BRIEF DESCRIPTION OF THE DRAWINGS

FIG. 4 illustrates a relationship between a charging rate and a charging voltage of the battery shown in FIG. 2 for several different values of charging current.

DESCRIPTION OF THE PREFERRED EMBODIMENTS

In the following, the preferred embodiments of the control device for a battery according to the present invention will be explained with reference to the attached drawings.

Figure 1:
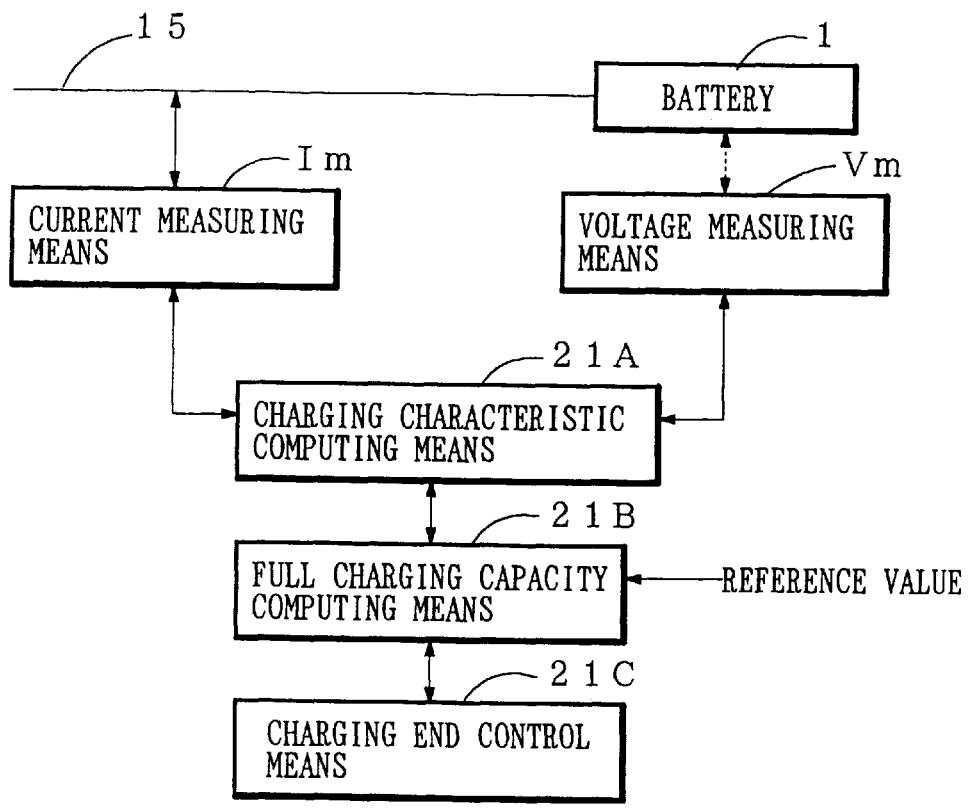
FIG. 1 illustrates a basic construction of a control device for a battery according to the present invention.
Figure 2:
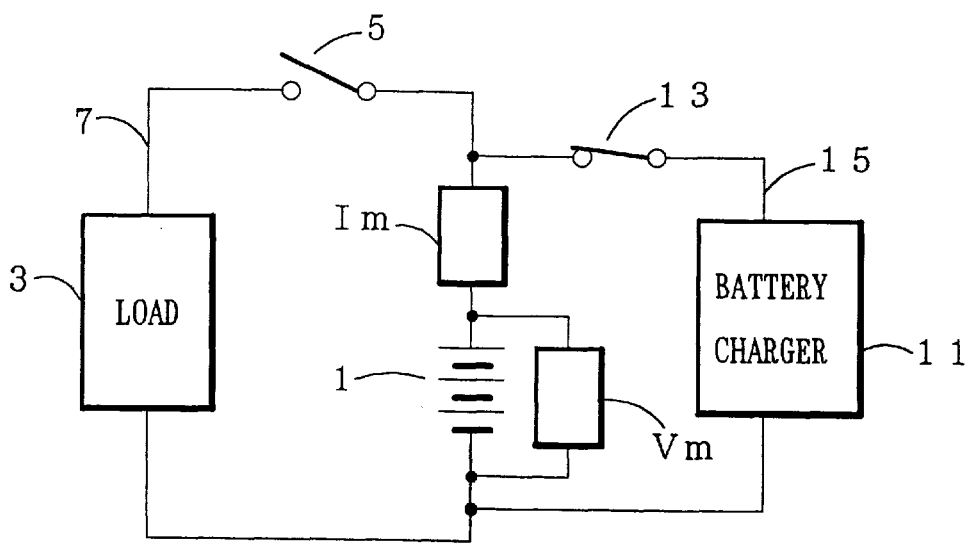
FIG. 2 is a constructive outline of a power supply system in a vehicle, to which the control device for a battery according to the present invention is applied, illustrating by using schematic block diagram partially.

FIG. 2 is a constructive outline of a power supply system in a vehicle, to which the control device for a battery according to the present invention is applied, illustrating by using schematic block diagram partially. The power supply system according to the present preferred embodiment includes: a load driving circuit 7 connecting a load 3 operated by an electric power supplied from a battery 1 to the battery 1 through a switch 5; and a charging circuit 15 connecting a battery charger 11 supplying an electric power for charging to the battery 1 to the battery 1 through a switch 13.

Figure 3:
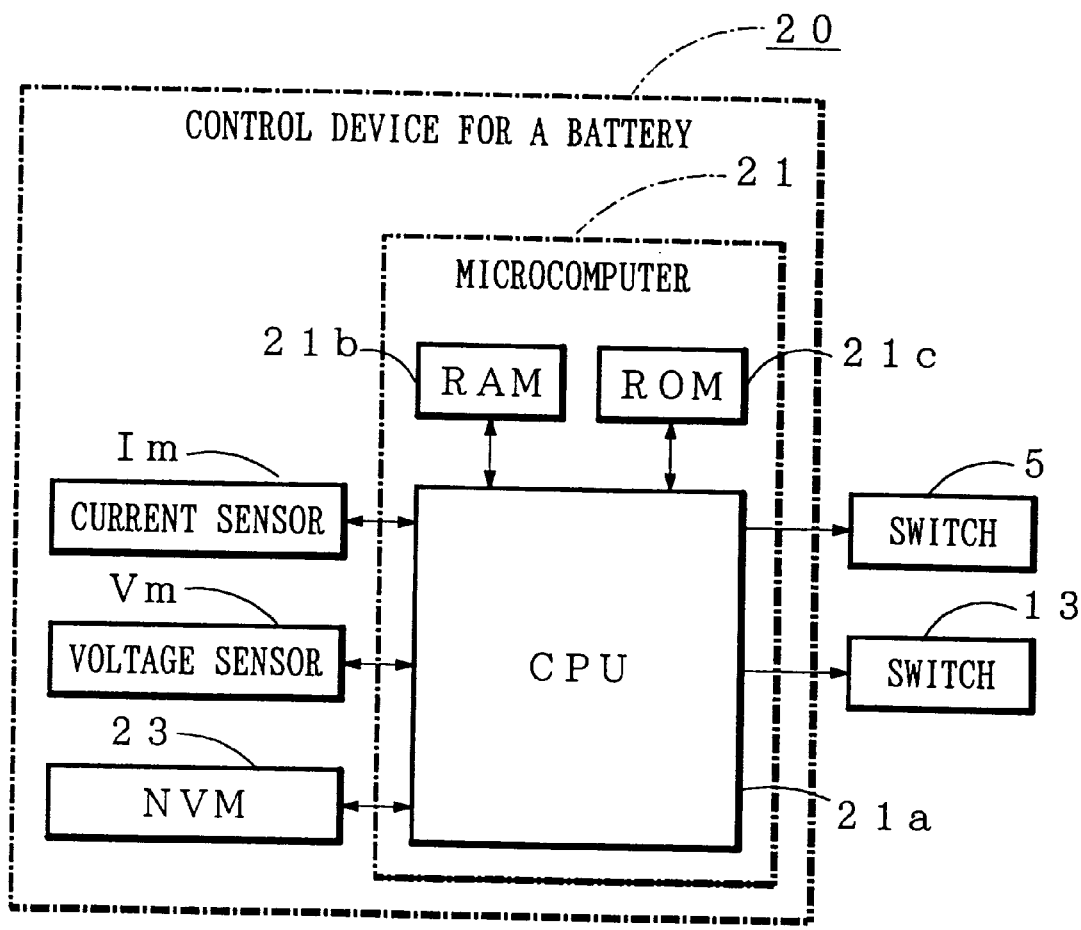
FIG. 3 is a schematic block diagram illustrating a constructive outline of an electric system in the control device for a battery according to a preferred embodiment of the present invention.

FIG. 3 is a schematic block diagram illustrating a constructive outline of an electric system in the control device for a battery according to a preferred embodiment of the present invention. A control device 20 for a battery includes a microcomputer 21, a current sensor Im, a voltage sensor Vm and a non-volatile memory (hereinafter, NVM) 23.

The microcomputer 21 has a CPU 21a, a RAM 21b and a ROM 21c, wherein the RAM 21b, the ROM 21c, the switches 5 and 13, the current sensor Im, the volatge sensor Vm and the NVM 23 are connected to the CPU 21a.

The RAM 21b has a data area for memorizing various data and a work area for use in various processes. The ROM 21c installs controlling programs to allow the CPU 21a to execute various processes.

The switch 5 is close when the battery 1 is in the discharge mode and open when the battery 1 is in the charge mode, while the switch 13 is open when the battery 1 is in the discharge mode and close when the battery 1 is in the charge mode.

As shown in FIG. 2, the current sensor Im (corresponding to the current measuring means) is connected to the battery 1 in series in a common portion of the load driving circuit 7 and the charging circuit 15 so as to measure a charging current $I_c$ flowing in the charging circuit 15 when the battery 1 is in the charge mode.

The voltage sensor Vm (corresponding to the voltage measuring means) is connected to the battery 1 in parallel so as to measure a terminal voltage $V_e$ of the battery 1 when the battery 1 is in the charge mode.

The NVM 23 installs and memorizes in advance a reference value $I_{ref}$ (corresponding to the predetermined reference value of the charging current) of the charging current $I_c$, which is a value showing a linear changing characteristic with respect to a change in the charging capacity of the battery 1, a full charging capacity $P_s$ and a remaining capacity $P_i$ of the battery 1, wherein, at the beginning, a value of charging capacity for the battery 1 when it is brand-new is installed and memorized as the full charging capacity $P_s$ or the remaining capacity $P_i$.

In the following, it will be explained how the reference value $I_{ref}$ of the charging current $I_c$, which is installed and memorized in the NVM 23 in advance, is determined.

When many data of the terminal voltage $V_e$ of the battery 1 in the discharge mode and a discharging current $I_d$ are collected and the method of least squares is applied to average values thereof, a linear equation ($I_d = AV_e + B$) indicating a specific correlation between the terminal voltage $V_e$ and the charging current $I_d$ can be derived as described in, for example, Japanese Patent Application Laid-Open H8-62310.

Substituting a specific value of current as the discharging current $I_d$ in the above linear equation yields the terminal voltage $V_e$, from which the remaining capacity of the battery 1 can be derived.

When the relation described above is applied to a relation between the terminal voltage $V_e$ of the battery 1 in the charge mode and the charging current $I_c$, a linear equation ($I_c = AV_e + B$) indicating a specific correlation therebetween can be derived.

The charging voltage $V_c$ having a specific correlation with the full charging capacity $P_s$ of the battery 1 can be derived from a equation ($V_c = V_e + R_b \times I_c$), wherein $R_b$ is an internal impedance of the battery 1.

Therefore, provided that a rate of change in the internal impedance $R_b$ of the battery 1 during a charge is constant, substituting a specific value of current as the charging current $I_c$ in the above linear equation ($I_c = AV_e + B$) yields the terminal voltage $V_e$, then the terminal voltage $V_e$ and the above specific value of current are substituted in the equation ($V_c = V_e + R_b \times I_c$) to derive the charging voltage $V_c$, from which the full charging capacity $P_s$ of the battery 1 can be derived.

However, the rate of change in the internal impedance $R_b$ of the battery 1 during a charge drastically changes when the battery 1 approaches into its fully charged state, therefore, the derived charging voltage $V_c$ varies very much depending on the specific value of current that is substituted in the equation ($V_c = V_e + R_b \times I_c$).

Then, values of the terminal voltage $V_e$ and the charging current $I_c$ have been actually collected with respect to different values of the full charging capacity $P_s$, on the basis of which a relation between a charging rate of the battery 1 and the charging voltage $V_c$ is imaginarily derived with respect to various values of the charging current $I_c$, thereby it has been found that a particular value of the charging current $I_c$ exists so that a rate of change in the charging voltage $V_c$ becomes constant, otherwise the rate varies very much when the battery 1 approaches into its fully charged state as shown in FIG. 4.

Consequently, in the control device 20 for a battery according to the present preferred embodiment, the above particular value of the charging current $I_c$ is installed and memorized in the NVM 23 in advance as the reference value $I_{ref}$.

In the following, particularly a process for controlling the full charging capacity $P_s$ of the battery 1, which is executed by a CPU 21a in response to a controlling program installed in the ROM 21c, will be explained with reference to a flow chart in FIG. 5.

When the microcomputer 21 starts operating to start a program, the CPU 21a executes an initialization (step S1).

In the initialization in step S1, setting of flags in various flag areas provided in the work area of the RAM 21b, clearing of various buffer areas and zero-resets of count values in various counter areas are executed.

After the initialization in step S1 is finished, on the basis of an operation state of an accelerator pedal (not shown in the figure), whether a switching of the mode of the battery 1 from the discharging mode to the charging mode is necessary or not is confirmed (step S3). If the switching to the charging mode is not necessary (N in step S3), the step S3 is repeated until the switching to the charging mode becomes necessary.

On the other hand, if the switching to the charging mode is necessary (Y in step S3), the switch 5 is opened and the switch 13 is closed so as to switch the mode of the battery 1 from the discharging mode to the charging mode (step S5), then sampling of the terminal voltage $V_e$ and the charging current $I_c$ of the battery 1, measured by the voltage sensor Vm and the current sensor Im, respectively, is repeatedly executed specific times (for example, 10 to 100 times) in a short period of time (step S7) and then, the method of least squares is applied to average values thereof so that a linear equation ($I_c=AV_e+B$) indicating a correlation between the terminal voltage $V_e$ and the charging current $I_c$ of the battery 1 is derived (step S9).

Then, the reference value $I_{ref}$ installed and memorized in advance in the NVM 23 is substituted in the linear equation derived in the step S9 as the charging current $I_c$ so as to compute the terminal voltage $V_e$, then the internal impedance $R_b$ of the battery 1 is computed from the terminal voltage $V_e$ and the reference value $I_{ref}$ (the charging current $I_c$), then the terminal voltage $V_e$, the reference value $I_{ref}$ (the charging current $I_c$) and the internal impedance $R_b$ are substituted in the equation ($V_c=V_e+R_b \times I_c$) so as to derive the charging voltage $V_c$ of the battery 1 (step S11) and then, the full charging capacity $P_s$ of the battery 1 is estimated from the charging voltage $V_c$ (step S13).

Then, the full charging capacity $P_s$ of the battery 1 installed and memorized in the NVM 23 is revised to the full charging capacity $P_s$ estimated in the step S13 (step S15), then on the basis of the terminal voltage $V_e$ and the charging current $I_c$ of the battery 1, measured by the voltage sensor Vm and the current sensor Im, respectively, an integrated capacity $P_n$ of an electric power charged into the battery 1 after the most recent opening of the switch 5 and closing of the switch 13 in the step S5 is computed (step S17).

Then, the integrated capacity $P_n$ computed in the step S17 is added to the remaining capacity $P_i$ of the battery 1, which is computed during every discharge mode to be revised to the most current value thereof and installed and memorized in the NVM 23, the current remaining capacity $P_i$ of the battery 1 is computed (step S19) and then, whether the current remaining capacity $P_i$ has reached the full charging capacity $P_s$ of the battery 1 installed and memorized in the NVM 23 or not is confirmed (step S21).

The computation of the remaining capacity $P_i$ of the battery 1 during a discharg mode can be carried out, for example, as described in Japanese Patent Application Laid-Open H8-62310 as follows: sampling of the terminal voltage $V_e$ and the charging current $I_c$ of the battery 1, measured by the voltage sensor Vm and the current sensor Im, respectively, is repeatedly executed; then the method of least squares is applied to average values thereof so that a linear equation ($I_d=AV_e+B$) indicating a correlation between the terminal voltage $V_e$ and the discharging current $I_d$ of the battery 1 is derived; and a specific value of current is substituted in the equation as the discharging current $I_d$ so as to derive the terminal voltage $V_e$.

If the remaining capacity $P_i$ has reached the full charging capacity $P_s$ (Y in the step S21), the switch 13 is opened (step S23), then on the basis of an operation state of the accelerator pedal (not shown in the figure), whether a switching of the mode of the battery 1 from the charging mode to the discharging mode is necessary or not is confirmed (step S25).

If the switching to the discharging mode is not necessary (N in the step S25), the flow returns to the step S17, on the other hand, if the switching to the discharging mode is necessary (Y in the step S25), the switch 5 is closed so as to switch the mode of the battery 1 from the discharging mode to the charging mode (step S27), then the flow returns to the step S3.

If the remaining capacity $P_i$ has not reached the full charging capacity $P_s$ (N in the step S21), on the basis of an operation state of the accelerator pedal (not shown in the figure), whether a switching of the mode of the battery 1 from the charging mode to the discharging mode is necessary or not is confirmed (step S29). If the switching to the discharging mode is not necessary (N in the step S29), the flow returns to the step S17, on the other hand, if the switching to the discharging mode is necessary (Y in the step S29), the switch 5 is closed and the switch 13 is opened so as to switch the mode of the battery 1 from the discharging mode to the charging mode (step S31), then the flow returns to the step S3.

Figure 5:
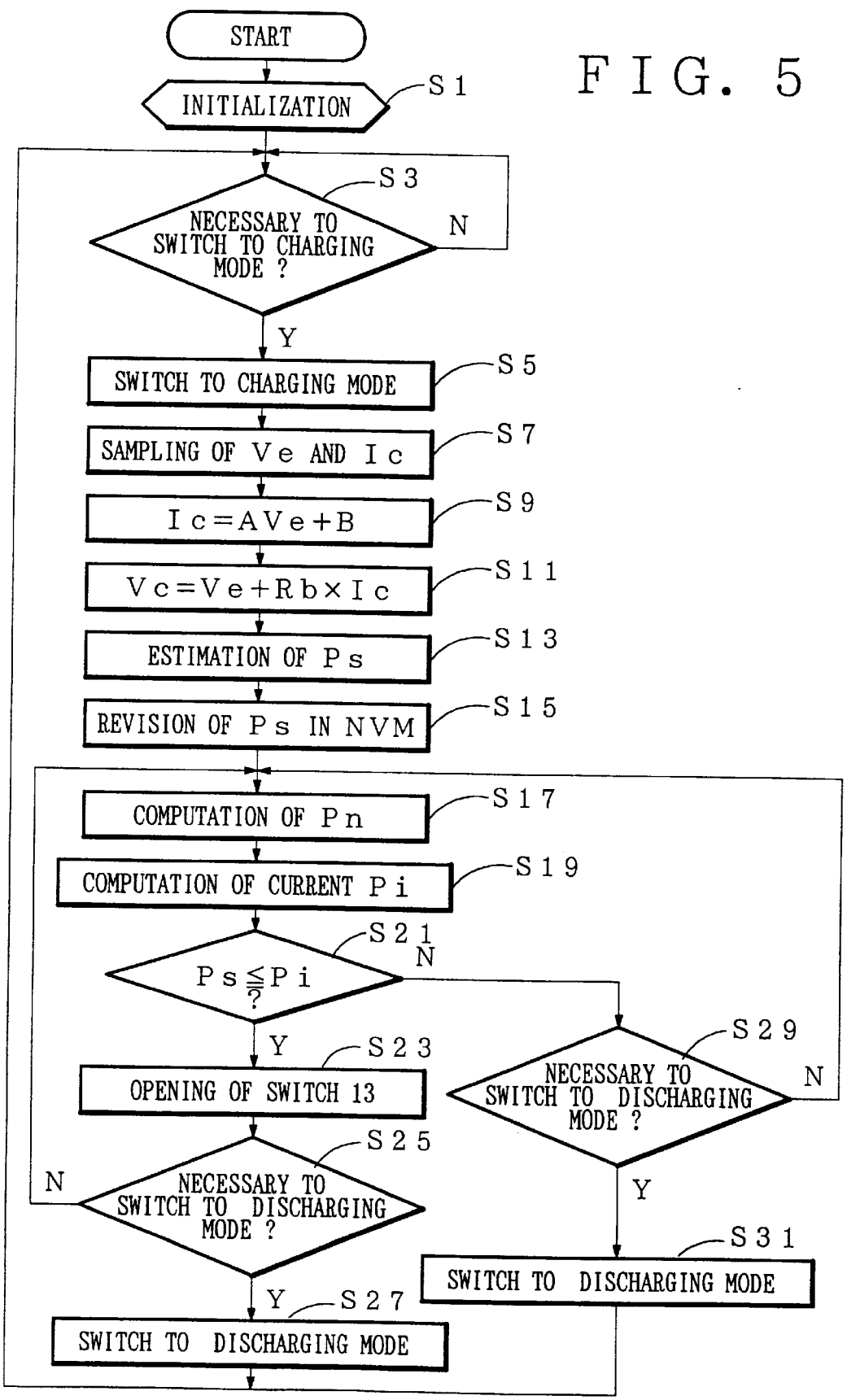
FIG. 5 is a flow chart illustrating particularly a process for controlling the full charging capacity of the battery, which is executed by a CPU in response to a controlling program installed in a ROM in a microcomputer shown in FIG. 3.

As evident from the explanation described above, in the present preferred embodiment, the steps S7 and S9 in the flowchart shown in FIG. 5 are processes corresponding to the charging characteristic computing means 21A, the steps S11 and S13 in the flowchart shown in FIG. 5 are processes corresponding to the full charging capacity computing means 21B, and the steps S17 and S23 in the flowchart shown in FIG. 5 are processes corresponding to the charging end control means 21C.

In the following, an operation of the control device 20 for a battery according to the present preferred embodiment, which is constructed as described above, will be explained.

After starting an operation of the control device 20 for a battery, when the battery 1 is in the discharging mode, on the basis of the terminal voltage $V_e$ and the charging current $I_c$ of the battery 1, measured by the voltage sensor Vm and the current sensor Im, respectively, the remaining capacity $P_i$ of the battery 1 is computed every time so as to revise the remaining capacity $P_i$ installed and memorized in the NVM 23 to be the most current value thereof.

On the other hand, when the mode of the battery 1 is changed from a discharging mode to a charging mode so that a charge of the battery 1 by the battery charger 11 is started, on the basis of the terminal voltage $V_e$ and the charging current $I_c$ of the battery 1, repeatedly measured for specific times by the voltage sensor Vm and the current sensor Im, respectively, together with the reference value $I_{ref}$ in the NVM 23, the full charging capacity $P_s$ of the battery 1 is estimated, then the full charging capacity $P_s$ in the NVM 23 is revised to thus estimated full charging capacity $P_s$.

Since the full charging capacity $P_s$ of the battery 1 is estimated on the basis of the reference value $I_{ref}$ in the NVM 23 which is a particular value of the charging current $I_c$ allowing that a rate of change in the charging voltage $V_c$ becomes constant even when the battery 1 approachs its fully charged state, therefore, the estimated full charging capacity $P_s$ of the battery 1 never fails to match with an actual value thereof.

After the full charging capacity $P_s$ in the NVM 23 is revised, on the basis of the terminal voltage $V_e$ and the charging current $I_c$ of the battery 1 measured by the voltage sensor Vm and the current sensor Im, respectively, the integrated capacity $P_n$ of an electric power charged into the battery 1 is computed every time, then the most current integrated capacity $P_n$ is added to the most current value of the remaining capacity $P_i$ in the NVM 23, thereby the current remaining capacity $P_i$ of the battery 1 is computed.

When the remaining capacity $P_i$ has reached the full charging capacity $P_s$, the switch 13 is opened so as to make the charging circuit 15 be an open loop even if the battery 1 still is in a charging mode, thereby the charging of the battery 1 by the battery charger 11 is ended.

Consequently, in the charging mode of the battery 1, the battery 1 never is overcharged by passing over the most current full charging capacity $P_s$ installed and memorized in the NVM 23.

According to the control device 20 for a battery of the present preferred embodiment, in the charging mode of the battery 1, sampling of the terminal voltage $V_e$ and the charging current $I_c$ of the battery 1, measured by the voltage sensor Vm and the current sensor Im, respectively, is repeatedly executed for specific times, then the method of least squares is applied to average values thereof so that a linear equation ($I_c=AV_e+B$) indicating a correlation between the terminal voltage $V_e$ and the charging current $I_c$ of the battery 1 is derived. In order to derive the charging voltage $V_c$ of the battery 1 on the basis of this linear equation and to estimate the full charging capacity $P_s$ of the battery 1 from the charging voltage $V_c$, the following construction is adopted.

That is, a value of current, which is substituted in the correlation equation between the terminal voltage $V_c$ and the charging current $I_c$ as the charging current $I_c$ in order to derive the charging voltage $V_c$, is set to be a particular value of the charging current $I_c$, which allows that a rate of change in the charging voltage $V_c$ becomes constant even when the battery 1 approachs its fully charged state.

With the construction described above, even if the rate of change in the internal impedance $R_b$ of the battery 1 with respect to a change in the charging capacity is not constant depending upon a value of the charging current $I_c$ when the battery 1 approachs its fully charged state, the current full charging capacity $P_s$ can be accurately estimated on the basis of the currently measured values of the terminal voltage $V_e$ and the charging current $I_c$ which includes an influence of change in the full charging capacity $P_s$ due to a deterioration of the battery 1 caused by its repeated charge and discharge and a change in surrounding temperature.

A piece of construction such that the current full charging capacity $P_s$ is estimated so as to revise a value thereof installed and memrized in the NVM 23 whenever the mode of the battery 1 is switched from the discharging mode to the charging mode and that the current remaining capacitor $P_i$ of the battery 1 is derived every time while the charging mode of the battery 1 lasts, and that the charging of the battery 1 by the battery charger 11 is ended when the remaining capacity $P_i$ reaches the full charging capacity $P_s$ in the NVM 23, may be omitted.

However, the above piece of construction is preferably adopted, since this construction allows that the battery 1 can be fully charged up to the most current accurate full charging capacity $P_s$ and prevents the battery 1 from being overcharged by passing over the full charging capacity $P_s$ and from deteriorating.

The method by which the remaining capacity $P_i$ of the battery 1 is computed in a discharging mode is not limited to the method described in Japanese Patent Application Laid-Open H8-62310, which is explained in the present preferred embodiment, but can be any known method.

Although an explanation of the control device for a battery is carried out employing an example of a power supply system of a vehicle in the present preferred embodiment, the control device for a battery according to the present invention can be applied to various control device for a battery besides devices for use in a vehicle.

The aforementioned preferred embodiments are described to aid in understanding the present invention and variations may be made by one skilled in the art without departing from the spirit and scope of the present invention.

As described above, the present invention is to provide a control device for a battery charged by an electric power supplied through a power supplying line for charging, comprising: voltage measuring means for measuring a charging voltage of the power supplying line; current measuring means for measuring a charging current flowing through the power supplying line; charging characteristic computing means for computing an approximate correlated linear characteristic between the charging voltage and charging current on the basis of periodic changes in the charging voltage measured by the voltage measuring means and in the charging current measured by the current measuring means during a charging operation of the battery; and full charging capacity computing means for computing a full charging capacity of the battery on the basis of the approximate correlated linear characteristic computed by the charging characteristic computing means and a predetermined reference value of the charging current.

With the construction of the control device for a battery described above, even if the charging current in a state in the vicinity of the fully charged state of the battery significantly changes in response to surrounding temperature caused by a fluctuation of change in an internal impedance of the battery due to the surrounding temperature, the full charging capacity of the battery can be accurately computed on the basis of the approximate correlated linear characteristic between the terminal voltage and the charging current of the battery, thereby the battery charged by an electric power supplied through a power supplying line for charging can be accurately controlled.

The predetermined reference value of the charging current is a value showing a linear changing characteristic with respect to a change in the charging capacity of the battery.

With the construction described above, the full charging capacity computing means accurately computes a full charging capacity of the battery at any time from the beginning to the end of a charging operation, thereby the battery in the charging state can be accurately controlled at any time during the charging operation.

The control device for a battery further comprises charging end control means for controlling an end of charging operation of the battery in response to the full charging capacity thereof, wherein the charging characteristic computing means computes the approximate linear characteristic whenever the charging operation of the battery arises, the full charging capacity computing means computes the full charging capacity of the battery whenever the charging operation of the battery arises, and the charging end control means changes a timing of an end of charging operation of the battery in response to the full charging capacity thereof most currently computed whenever the full charging capacity computing means computes the full charging capacity of the battery.

With the construction described above, the end of charging operation of the battery is controlled by the charging end control means in response to the full charging capacity computed by the full charging capacity computing means during the charging operation, thereby the battery can be fully charged up to the full charging capacity and securely prevented from being overcharged.

What is claimed is:

1. A control device for a battery charged by an electric power supplied through a power supplying line for charging, comprising:

voltage measuring means for measuring a charging voltage of the power supplying line;

current measuring means for measuring a charging current flowing through the power supplying line;

charging characteristic computing means for computing an approximate correlated linear characteristic between the charging voltage and charging current on the basis of periodic changes in the charging voltage measured by the voltage measuring means and in the charging current measured by the current measuring means during a charging operation of the battery; and full charging capacity computing means for computing a full charging capacity of the battery on the basis of the approximate correlated linear characteristic computed by the charging characteristic computing means and a predetermined reference value of the charging current.

2. The control device according to claim 1, wherein the predetermined reference value of the charging current is a value showing a linear changing characteristic with respect to a change in the charging capacity of the battery.

3. The control device according to claim 1 or 2, further comprising charging end control means for controlling an end of charging operation of the battery in response to the full charging capacity thereof, wherein the charging characteristic computing means computes the approximate linear characteristic whenever the charging operation of the battery arises, the full charging capacity computing means computes the full charging capacity of the battery whenever the charging operation of the battery arises, and the charging end control means changes a timing of an end of charging operation of the battery in response to the full charging capacity thereof most currently computed whenever the full charging capacity computing means computes the full charging capacity of the battery.

* * * * *